United States Patent

Liang

[11] Patent Number: 5,889,776
[45] Date of Patent: Mar. 30, 1999

[54] PHYSICAL LAYER SWITCH SYSTEM FOR ETHERNET LOCAL AREA NETWORK COMMUNICATION SYSTEM

[75] Inventor: Chao-Yu Liang, Cupertino, Calif.

[73] Assignee: Alpnet Corporation, Santa Clara, Calif.

[21] Appl. No.: 791,868

[22] Filed: Jan. 31, 1997

[51] Int. Cl.$^6$ .................................................. H04L 12/44
[52] U.S. Cl. ........................ 370/389; 370/401; 370/445
[58] Field of Search .................................. 370/445, 447, 370/353, 354, 357, 359, 360, 362, 462, 468, 477, 236, 239, 389, 392, 401, 412, 422, 407, 408, 446, 414

[56] References Cited

U.S. PATENT DOCUMENTS

| | | | |
|---|---|---|---|
| 5,416,769 | 5/1995 | Karol | 370/414 |
| 5,568,476 | 10/1996 | Sherer et al. | 370/447 |
| 5,570,348 | 10/1996 | Holden | 370/236 |
| 5,757,795 | 5/1998 | Schnell | 370/392 |
| 5,790,546 | 8/1998 | Dobbins et al. | 370/392 |

*Primary Examiner*—Chi H. Pham
*Assistant Examiner*—Maikhanh Tran
*Attorney, Agent, or Firm*—Joe Zheng; Chi Ping Chang

[57] ABSTRACT

A physical switch system employing a N:M switch circuit, coupled with a layer 2 switch at one end and with a network interface at the other end, for data network system is disclosed. The N:M switch comprises N number of ports on one side and M number of ports on the other side, wherein N and M are not necessarily the same. Based on the addresses describing each of the ports, the N:M switch is capable of establishing electronic links between the ports on both sides and further disengaging the links therebetween upon detecting the completion of data transmission. The disclosed switch system provides an efficient switching mechanism of rescalabitity and modularity in network switch systems.

21 Claims, 6 Drawing Sheets

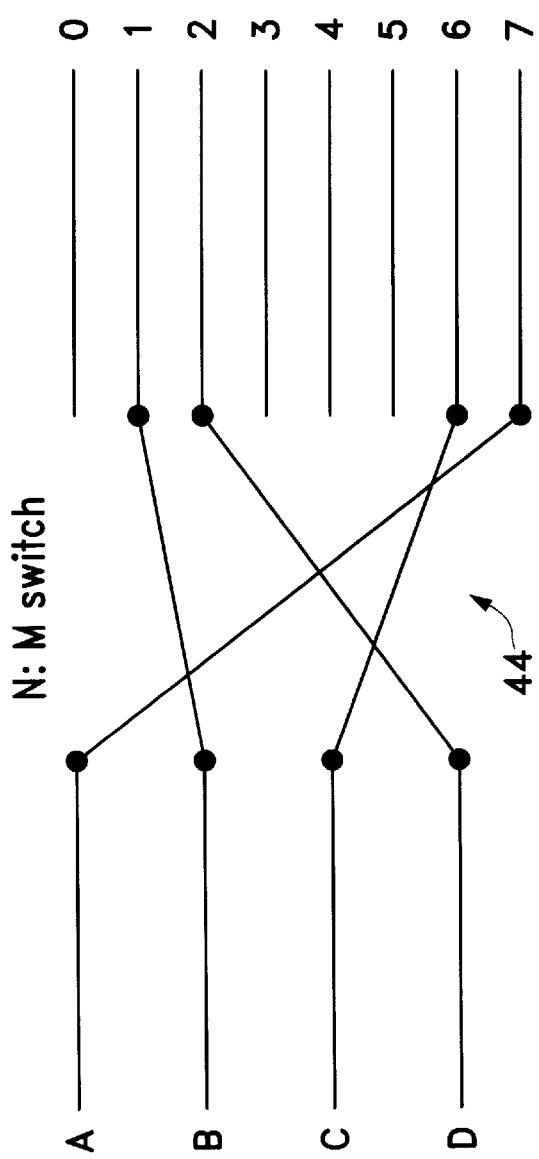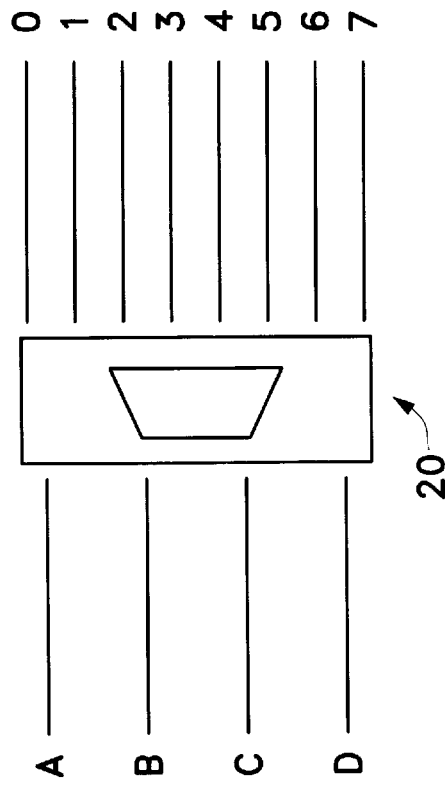
Fig. 2a
Fig. 2b

PHYSICAL LAYER SWITCH SYSTEM FOR ETHERNET LOCAL AREA NETWORK COMMUNICATION SYSTEM

FIELD OF INVENTION

The present invention relates to the area of Ethernet local area network, and more particularly relates to a physical layer switching system that employs a N:M switch circuit to establish an electronic link to a port that receives a packet to one of the available ports that are connected to a plurality of packet processing channels, respectively, and disengages the linkage upon the completion of the packet transmission, wherein N and M are not necessarily the same.

DESCRIPTION OF THE RELATED ART

Local Area Network (LAN) is generally used for data communication in enclosed areas such as one wing of one floor in a building or several buildings on a campus. Because of the locality nature of the LAN, there are various network architectures that guide data to move across wires, cables or other media. Of all the architectures, Ethernet and token ring are the most commonly used network architectures. One of the basic differences between the two architectures is the transmission speed versus data collision. With Ethernet, any device on the network, for example, from central computers in headquarters to local computers on office desktops, can exchange data in a packet frame to any other locations in the network at any time. Because there are a plurality of the machines/devices on the network and very likely some of them send data at the same time, thereby the simultaneous data transmission on the same network may result in what is called data collision. To avoid such collision, the Ethernet LAN based on Carrier Sense Multiple Access/Collision Detection (CSMA/CD) technique is able to make the machines/devices stop transmitting data if the network is busy and wait for a while and try to transmit the same data again. While in a token ring LAN, as the name suggests, there is no data collision, a machine to send data must wait for a token to invoke a data transmission, often resulting in lower data transmission efficiency. The Ethernet LAN is therefore more adopted in network applications in which there are one or a few central computers or servers communicating with a plurality of devices or clients or a plurality of devices in communication with each other.

To further enhance the data transmission performance in the LAN, especially in which there are a plurality of devices in communication with each other, a switch arrangement system is often employed to manage the transmission of packets in order to increase data transmission throughput. There have been many efforts in developing such a switch system that is able to reroute the arriving packets to any available ports to their respective destinations without any time delay. It is known to the art that one of the switch systems is a Time-Space-Time switch that uses a controller to schedule the arrivals of the packets. Each arriving packet to the switch preceded by a time slot interchange is rearranged in the time sequence so that arriving packets are destined for distinct separate outputs. However, the real implementation of such a switch system turns out that to schedule the packet arrivals is a difficult task and requires too much time to determine permissible input to output combinations.

Most of the switch systems in the Ethernet LAN today are Layer 2 switch or Layer 3 switch. The switch systems comprise a switch fabric that has an equal number of packet processing channels as the number of devices connected to the switch system, referred to as N:N switch system. Each of the packet processing channels further comprises a plurality of electronic components, media access controller (MAC), first-in-first-out (FIFO) logic circuit and memory or buffers. Therefore, the N:N switch means that there are N packet processing channels, each designated to one of the N devices directly or indirectly in connection to the switch system in the LAN, for example, one switch fabric has 8 packet processing channels or ports, and so exactly eight devices can be connected thereto. Some of the ports in the switch fabric often become idle when there are no data transmissions through the ports. Moreover these idle ports can not be used as alternative routing paths for other arriving packets accumulated at a busy port. A busy port however can only transmit one packet each time. If the continuously arriving packets destining for the busy port are not timely rerouted, the busy port would suffer what is called back pressures from the arriving packets, resulting in signal jams that induce an even busier traffic or network throughput degradation in the network. Such switch architecture is obviously not efficient and cost effective especially in desktop network environment in which each desktop device does not have data to transmit in the network all the time. That means that the network traffic does not present a constant data flow in the network traffic. Instead the network traffic pattern has been observed to be a burst pattern, meaning a number of devices tend to talk to a central machine or another device only for a short period of time and then the network becomes idle for the rest of the time. This proves that the current switch fabric architecture is not being used to its capacity as the ports in the switch fabric are dedicated permanently to each path.

There is, therefore, a great need for an intelligent network switch system in which a switch circuit can establish a linkage between a device and a packet processing channel in the switch system upon receiving an arriving packet from the device and disengage the linkage upon the completion of the packet transmission and establish another linkage between another device and the packet processing channel if a newly arrived packet is from the device. The combined use of the ports and packet processing channels can ease dramatically the traffic and increase the efficiency of the switch system in the network.

In many smaller Ethernet LANs, there are a large number of devices but only one or few central machines/servers. These devices have the same privilege to talk to the central machines but work independently most of the time and only occasionally communicate to one of the central machines for a short period of time. To install a switch system with a N:N switch therein in the network is a low-efficient approach. Moreover, the cost of the switch system increases as the number of the device increases. Thus there has been another need for a network switch system that is of different scalability and modularity. This means that a switch system can be reconfigured with ease to meet the need of the increased number of the local devices without increasing the cost of the switch systems. In other word, the cost of the switch system is primarily controlled by the network traffic rather than the number of the local devices.

SUMMARY OF THE INVENTION

The present invention provides a switch system that comprises a switch fabric and a N:M switch circuit. The switch circuit having a plurality of ports on the N-side and a plurality of ports on the M-side provides electronically controllable links between an equal number of the ports on the N-side and the M-side, respectively, thereby packets arriving at either sides can pass through the switch circuit. Upon the completion of the packets, the links are disengaged in the switch circuit and the ports previously linked become available for new links to other ports. The ports, especially on the N-side, are effectively used.

In one embodiment, the switch system comprises a switch fabric comprising a plurality of packet processing channels, each comprising a buffer and a media access controller, a N:M switch circuit. The switch system is preferably coupled with a network interface. The network interface has a plurality of first ports and second ports. Devices in communication to each other are preferably connected individually to the second ports of the network interface, respectively. Each of the packet processing channels is coupled to each of the ports on the N-side of the switch circuit and each connection thereof or each of the ports on the N-side of the switch circuit or each of the packet processing channels is assigned to a first address. The first ports of the network interface are individually connected to each of the ports on the M-side of the switch circuit and each connection thereof or each of the first ports of the network interface or each of ports on the M-side of the switch circuit is assigned to a second address. When a packet arrives at one of the first ports of the network interface, there is a means in the network interface for generating a carrier sense signal, which is asserted to the beginning of the packet signal and lasts through the packet signal. The carrier sense signal is sent to a register as a bit signal that corresponds to the port that has received the packet in the network interface. The switch system further comprises a status look-up circuit that constantly monitors on the register in the network interface. Upon detecting the present of the bit signal, the status look-up circuit immediately retrieves an available first address of the port on the N-side in the switch circuit and sends the address along with the bit signal to the switch circuit which establishes a connection between the port specified by the first address and the port indirectly specified by the bit signal, thereby the arrived packet passes through the switch circuit to the packet processing channel. Upon the completion of the packet, the connection is disconnected is and the ports, especially the port on the N-side, become available to newly coming packets. Similarly, when a packet from one of the packet processing channel arrives at one of the N-side of the switch circuit, the status look-up circuit checks the availability of the port in the network interface based on the destination information in the arrived packet. A link is established in the switch circuit between the port on the N-side specified by the buffer address in the switch fabric and the port on the M-side specified by the destination address that is supplied by the status look-up circuit, thereby the arrived packet passes through the switch circuit. The MAC in the switch fabric upon the completion of the packet sends an interruption signal to the status look-up circuit that further instructs the switch circuit to immediately disengage the link, thus the previously linked ports become available for other newly arrived packets.

Accordingly, an important object of the present invention is to provide an intelligent physical layer switch system to effectively communicate between input and output ports in the Ethernet LAN;

Another object of the invention is to provide a physical layer switch system that is able to handle the burst traffic pattern for effective linkage in desktop network environment;

Still another object of the invention is to provide a cost-effective physical layer switch system that is capable of performing effective links between N inputs and M outputs wherein N is equal to M or generally larger than M;

Still another object of the invention is to provide a modularity switch architecture that is reconfigurable by users depending upon the traffic pattern and the number of the local devices in the network as well as the network cost;

Other objects, together with the forgoing are attained in the exercise of the invention in the following description and resulting in the embodiments illustrated in the accompanying drawings.

BRIEF DESCRIPTION OF THE DRAWINGS

FIG. 2(a) and (b) illustrate the concept of a N:M switch circuit and the graphical representation thereof, respectively;

PREFERRED EMBODIMENT—DESCRIPTION

Figure 1:
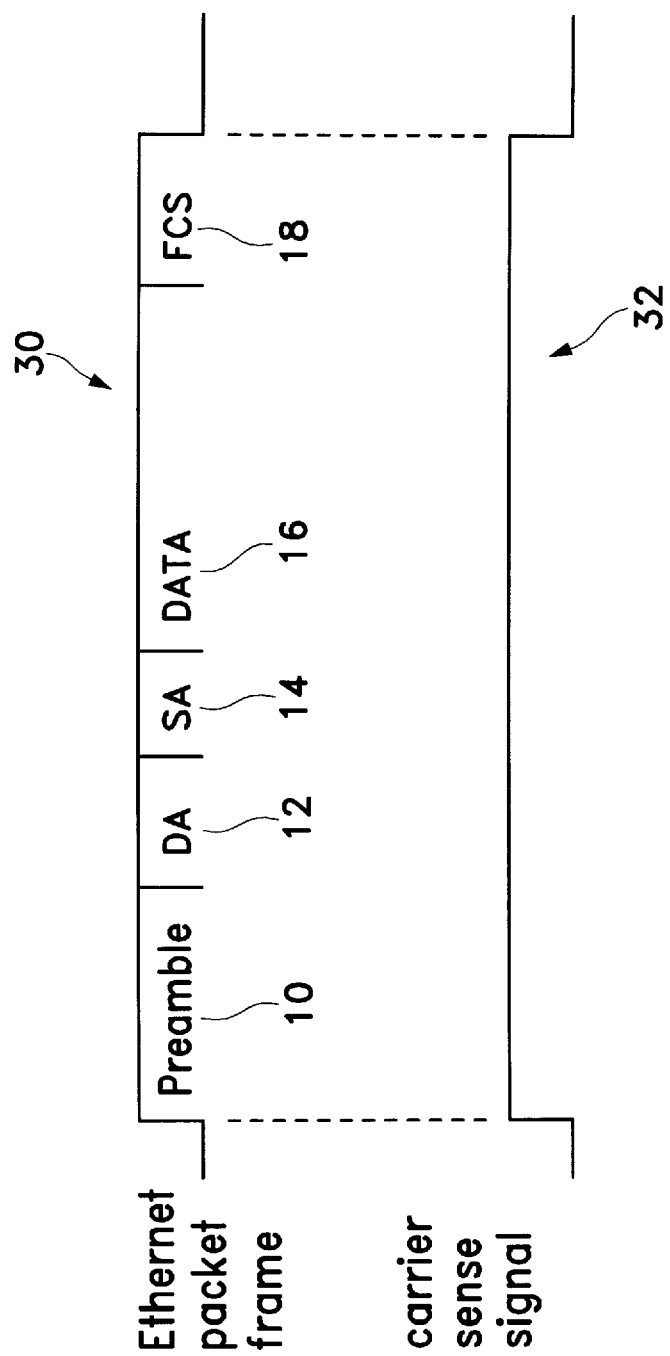
FIG. 1 shows a packet frame structure and a carrier sense signal generated upon the packet arriving at the disclosed switch system.

Referring now to the drawings, in which like numerals refer to like parts throughout the several views, FIG. 1 shows a packet frame structure 30 along with a carrier sense signal 32. A packet signal is a network message that comprises a header or preamble 10, destination address (DA) information 12, source address (SA) information 14, a sequence of transmitting data 16 and error control information such as frame check sum (FCS) 18. In FIG. 1 is depicted that a packet signal 30 changes the network signal level from low to high. It is known to those skilled in the art that many commercially available logic circuits can detect an arriving packet by examining the signal level. The length of the packet is at least 64 bytes long and normally not longer than 1518 bytes depending on the length of the transmitting data carried therein. When the data to be transmitted is longer than 1518 bytes, the data has to be divided into a few segments, each with a sequence identification, to be carried in several packets that are then transmitted individually and sequentially and eventually to be grouped back to the original data format at the destination based on the DA information and sequence identification therein. In fact, all packets are transmitted independently regardless of the data therein and relationships with other packets in the network. A carrier sense signal 32 is generated per each packet and asserted at the beginning of the packet signal 30 in the disclosed switch system upon receiving the packet signal 30. The carrier sense signal 32 lasts through the packet signal 30 and vanishes upon the completion of the packet signal 30.

Referring to FIG. 2(a), there shows a diagram of a N:M switch. In the figure N is equal to 4, meaning four ports labeled A, B, C and D, respectively and M is equal to 8, meaning eight ports labeled by 0 through 7, sequentially. Also shown in the figure is that four ports on the M-side are connected by a switch circuit 44 to four ports of the eight ports on the N-side. Ports on both sides may be used as input or output ports depending on how a signal flows. It is understood to those skilled in the art that the input and output ports meant in the forgoing and following descriptions are interchangeable. In reality no ports are physically designed as either inputs or outputs as all networks are bi-directional. The N:M switch means herein that the number of ports on both sides, the N-side and the M-side, may not be the same, preferably 8:8 or 4:8. Any one of the N-side ports can be electronically connected to any one of the M-side ports or vice versa and all the connections are done far before the arrival of the data portion in a packet, for example, 2 to 4 microseconds in a 10 megabit/second Ethernet LAN. To make the following further description of the invention without any ambiguities, it is assumed that the M-side ports, sometimes refereed to as the input ports, are designated towards devices in a LAN and the N-side ports, sometime referred to as output ports herein, are connected to or part of packet processing channels. This switch architecture in a Ethernet LAN provides an efficient and reconfigurable mechanism to reroute signals destining for the ports on the M-side to any one of the ports on the N-side. It is also known to those skilled in the art that the switch circuit 44 can be implemented in different forms with many array logic circuits. One of the embodiments of the switch circuit 44 is the use of an array of tri-state diodes, each being accessed by an address and turned to "On" when its respective address is entered. The graphical representation 20 of the switch circuit 44 is shown in FIG. 2(b) and used in the figures describing the embodiment of the invention in the sequel.

Figure 3:
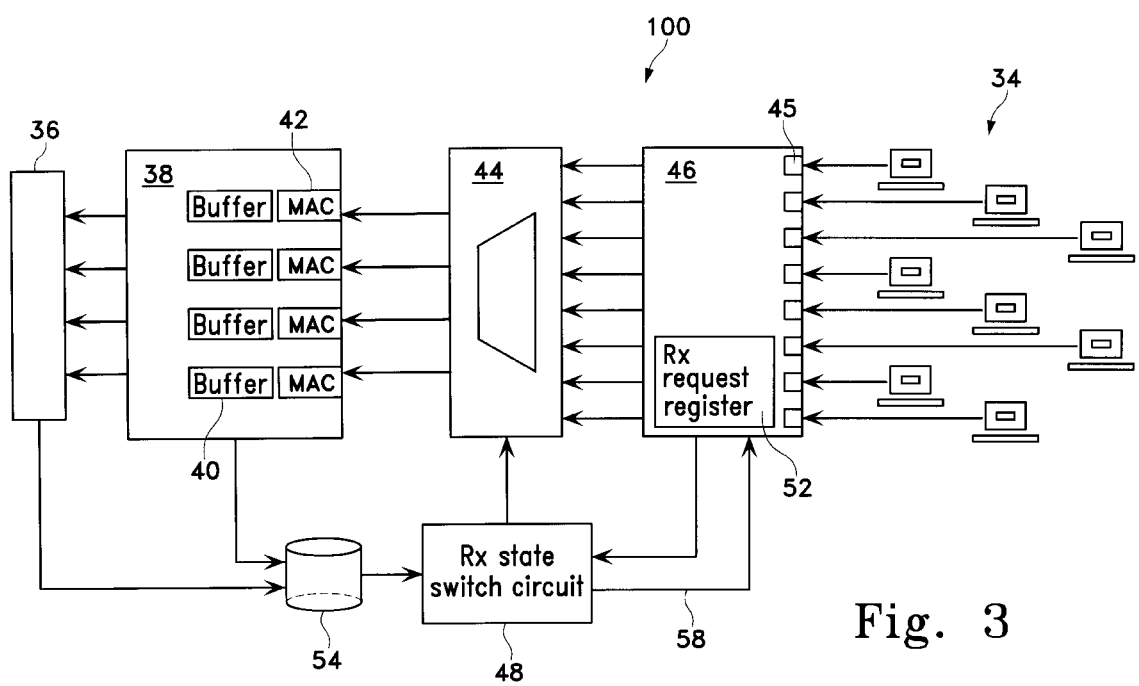
FIG. 3 demonstrates a schematic structure of one embodiment of the invention in a receiving mode.

Now referring to FIG. 3, there is depicted one embodiment of the layer 1 switch system in a receiving mode. Eight devices 34 as shown in the figure are in connection with the disclosed switch system 100 through which communications among the eight devices 34 become possible. The receiving mode means herein that the devices 34 tend to send data to the switch system 100 independently, simultaneously or randomly. The switch system 100 comprises a central processor 36, a switch fabric 38 comprising four packet processing channel, each comprising one buffers 40 and one media access controller (MAC) 42, a N:M switch circuit 44, and preferably a connectivity module or network interface 46. The operations of the switch system are controlled by the central processor 36. The switch fabric 38 is a layer switch 2 and known to those skilled in the art. Generally, a packet signal is processed in the MAC so that only transmitting data is retrieved therefrom, the buffer in the switch fabric 38 provides a tentative holding place for the data to be eventually transported to the designated destination specified in the data. A switch resource 54, similar to a database, controlled by the central processor 36, updates and keeps addresses of all available packet processing channels that are not being used or occupied by any packet, the addresses are directly related to the ports on the N-side of the N:M switch as well. In other words, the switch resource 54, serving as a look-up table, keeps the address of available ports in the N-side of the switch circuit 44. Whenever a buffer and corresponding MAC become available to take a packet, an address thereof is electrically entered into the switch resource 54. It is known to those skilled in the art that the switch resource 54 disclosed herein can be implemented by either a logic circuit or assembly codes embedded in the central processor 36. A receiving switch arbitration state circuit 48, defined as Rx switch state circuit, also controlled by the central processor, retrieves one available address each time and passes it to the N:M switch circuit 44 when there is a carrier sense signal 32 in the receiving request register 52, defined as Rx request register, in the connectivity module 46. The connectivity module 46 is a network interface between the N:M switch circuit 44 and the devices 34. Some of the functions that the connectivity module 46 performs include the detection of the presence of arriving packets, and the generation of the corresponding carrier sense signals therein. It is known to those skilled in the art that the connectivity module 46 may be implemented by one of the many commercial Ethernet cards, such as LXT904 by Level One Communications, Incorporated at 9750 Goethe Road, Sacramento, Calif. 95827. Each carrier sense signal generated in the connectivity module 46 is corresponding to one port of the connectivity module 46, which is also corresponding to one port of the M-side ports of the switch circuit 44. The carrier sense signals are kept in the RX request register as a plurality of bit signals accordingly. For example, an Rx request register is an 8-bit register. If the 8-bit becomes 00000000, it means none of the eight ports are receiving packet signals. If the 8-bit becomes 11000011, it means that the very first two and last two bits are the bit signals, which further means that the first and the last two ports, one being identified as 45 in the figure, of the connectivity module 46 are receiving packet signals and the requests to go through the switch system have been made therein. In addition, there is a jam signal line 58 between the Rx switch state circuit 48 and the connectivity module 46. A jam enabling signal is sent from the Rx switch state circuit 48 to the connectivity module 46 thought the line 58 if there is no port address available in the switch resource 54 for the arriving packet. Upon receiving the jam enable signal, the connectivity module 46, as known to those skilled in the art, being based on the CSMA/CD technique, will generate a jam signal which instructs the sending device to resend the packet. The switch circuit operating based on the retrieved address along with the bit signal passed on through the Rx switch state circuit 48 performs electronic links between the input and output ports and decouple the respective links therebetween as well when a corresponding carrier sense signal vanishes.

To be more specific, it is assumed that one of the devices 34 has sent data to another device through the switch system controlled by the central processor 36, a packet signal thereof arrives at the connectivity circuit 46. The preamble of the packet is detected therein. Upon detecting the preamble of the arriving packet, a carrier sense signal is generated and asserted at the beginning of the packet. The carrier sense signal is then latched into the RX request register 52 in the connectivity module 46, resulting in a change of the status thereof, i.e. having a bit signal. Meanwhile the Rx arbitration state circuit 48, also referred to as state look-up circuit, keeps examining the status of the Rx request register 52 at a system clock time, for example, every 33 nerosecond. As soon as the changed status of the Rx request register 52, i.e. the bit signal, is detected, the Rx switch state circuit 48 looks up in the switch resource database 54 for an address of any available packet processing channels in the switch fabric 38. It has been stated that the switch resource database 54 keeps the addresses of equivalent ports on the N-side in the switch circuit 44. If there is one address available, the switch circuit 44 turns on a link based on the retrieved address along with the bit signal retrieved by the Rx switch state circuit 48. If there is no address available, that means all buffers in the switch fabric 38 are being occupied and data is being transmitted, the Rx switch state circuit 48 sends a jam enabling signal through 58 back to the connectivity module 46 which further generates a jam signal to inform the sending device to resend the data.

Figure 4:
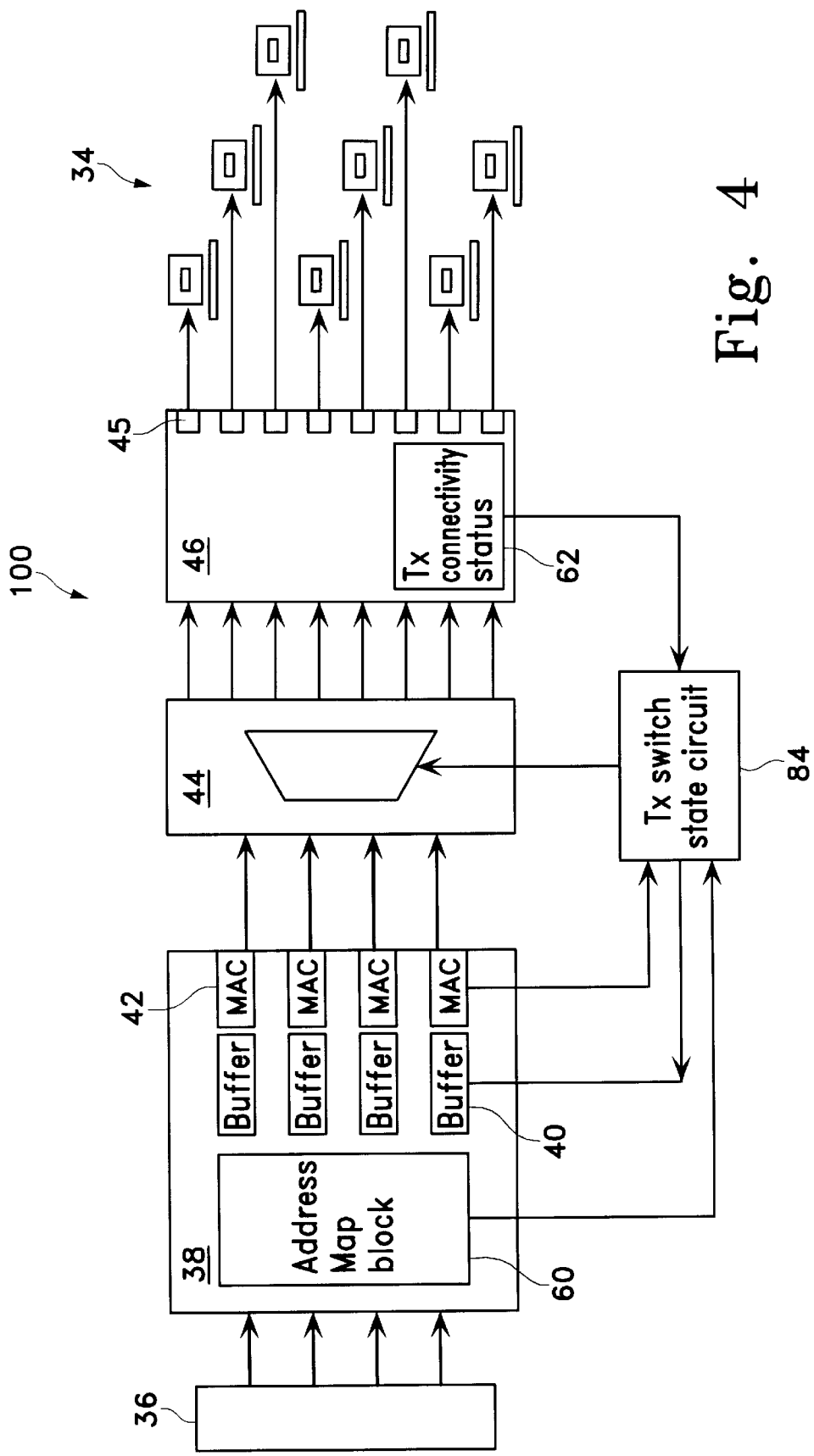
FIG. 4 demonstrates a schematic structure of one embodiment of the invention in a transmitting mode.

Now referring to FIG. 4, there is depicted one embodiment of the disclosed switch system in transmitting mode. The transmitting mode means herein that a central processor sends data or data stored in the buffers of the packet processing channels are transmitted to some of the devices in the network simultaneously or randomly. One typical example is to send a system message to a number of workstations from a device that is normally administered by a system operator. The switch fabric 38 that has been described in the foregoing description further comprises an address map block 60 that keeps a look-up table of all port identifications (ID) in the connectivity module 46. To be more specific, the input of the address map block 60 or the look-up table is the address implicitly embedded in the data to be sent and the output of the look-up table is the port identification to which the destination device is connected thereto. The connectivity module 46 further comprises a transmitting connectivity status register 62, also refereed as Tx status register that records the status of the ports in the connectivity module 46. For example, the register in FIG. 4 is a 8-bit register, each bit representing one port and the 8-bit register totally representing the eight ports as shown in FIG. 4. If all bits are 1's, such as 11111111 that means all ports are available. If one of the bits is 0, that means the corresponding port is not available possibly due to data being sent through that port.

When the central processor 36 is to transmit a queue of data to a certain number of, for example, four devices. The central processor 36 then sends four different packets, each destining for a corresponding device. By examining the address map block 60, the corresponding connectivity ports ID in the connection module 46 is determined and a transmit request signal is sent to the Tx switch circuit 84 that immediately looks up for the status of the port by retrieving the bit signal thereof from the Tx status register 62. If the bit signal is high or an indication of availability, the corresponding port ID is passed on to the N:M switch circuit 44 to perform a link between the packet processing channel and the port the device being connected to and meanwhile to send an transmit enable signal to the corresponding MAC in the switch fabric 38 to start the transmission. When the transmit is complete, the Tx switch circuit 84 receives an interrupt signal from the switch fabric. The Tx switch passes on the interrupt signal to the switch circuit to disengage the link to make the path available to requests from other ports. It is understood to those skilled in the art that the stored data in the buffer of a packet processing channel can be directly transmitted to its destination or indirectly to its destination through the memory in the central processor if the buffer size is limited.

Figure 5:
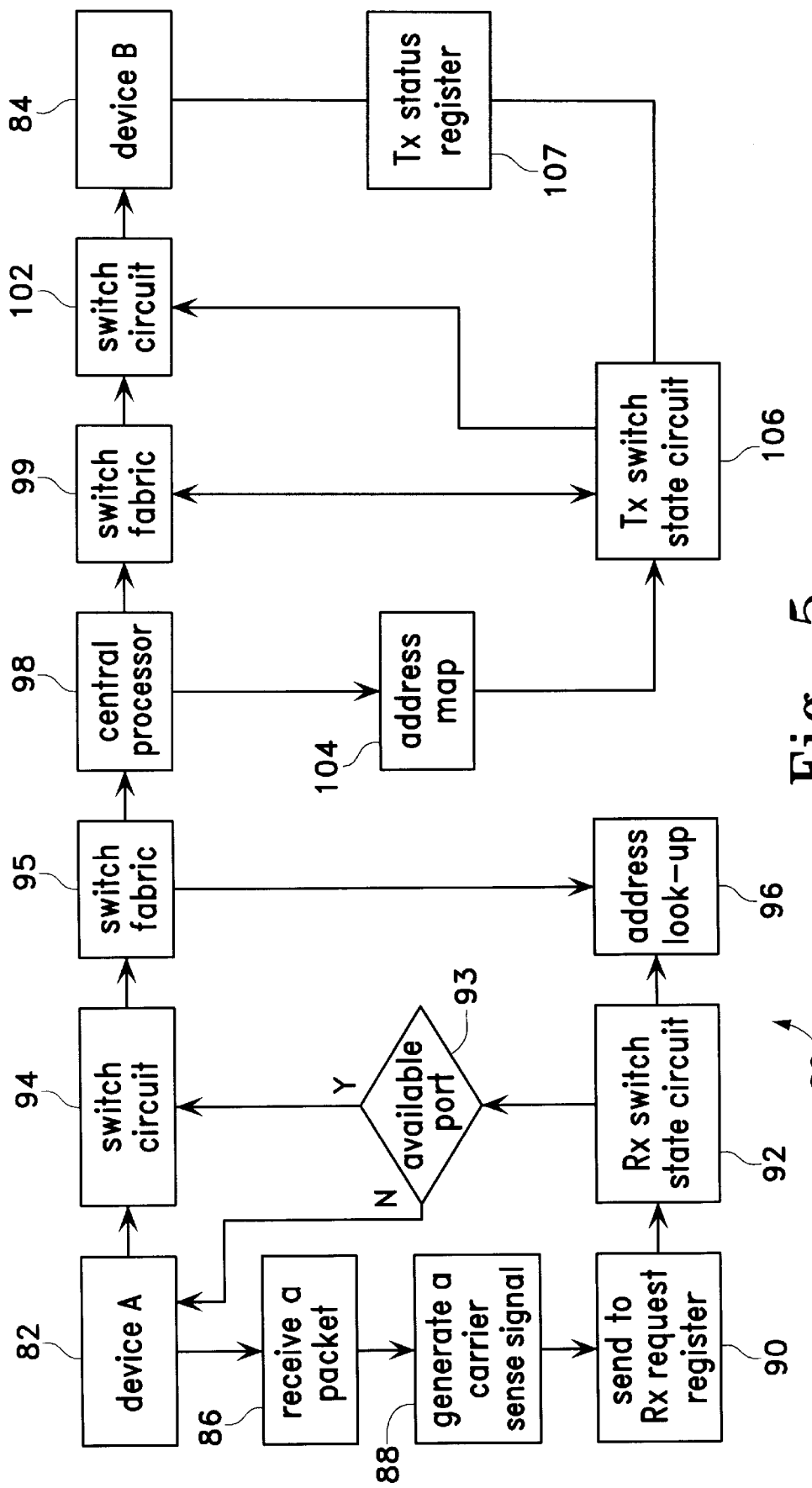
FIG. 5 shows a flowchart of the operation steps of the disclosed switch system in exercising a packet transmitted from one device to another.

Referring now to FIG. 5, there is shown a flowchart 80 that describes the logic operations of one device 82 in communication with another device 84 through the disclosed physical layer switch system. The figure shows steps of all operations and should be fully viewed in conjunction with FIGS. 3 and 4 for the implementations thereof. Both devices 82 and 84 are respectively connected to two different ports of the disclosed switch system through which device A 82 tends to send data to device B 84. Each of the two ports is identified by a unique port identification. The disclosed switch system as shown in FIG. 5 comprises two switch fabrics 95 and 99, two switch circuit 94 and 102 as well as the central processor 98. It should be understood to those skilled in the art that the two switch pairs 94, 95 and 99,102 are not two separate switch fabrics and switch circuits in the switch system. There is only one pair in the system. For illustration purpose, two pairs are present in the drawing, one for receiving case and the other for transmitting case. Device A 82 sends a packet similar to the one illustrated in FIG. 1 in which now the DA has the port ID information of the device B 84 after the packet passes through step 86. At step 86, the packet is received and the port ID information of the device B 84 is assigned. Based on the received packet, step 88 generates a carrier sense signal and asserts the carrier sense signal at the beginning of the packet signal, the carrier sense signal lasting through the packet signal. At step 90, the carrier sense signal is recorded as a bit signal that directly corresponds to the port ID assigned to the transmitting device A 82. At 92, a register constantly looks up for a presence of the carrier sense signal generated at step 90. Upon the detection of the carrier sense signal, the register at step 92 requests an address of available packet processing channel in switch fabric 95. Step 96 which works independently updates the addresses of the packet processing channels in the switch fabric 95 that are not occupied and used by any packets. The availability of the address of one packet processing channel dictates following two cases. First the address is not available at all, that means all packet processing channels in the switch fabric 95 are being used, either receiving packets from devices or transmitting packets to the devices. The register at 92 has to send out a control signal to enable a jam signal that goes to the device A 82 so that the device A 82 becomes aware of the busy port and re-sends the same packet signal. The second case is that an address of the packet processing channel is readily available. The register at 92 therefore retrieves the address from step 96 and sends it along with the bit signal from step 90 to the switch circuit 94. Based on the address of the packet processing channel and the port identification connecting the device A 82, a linkage between the port being specified by the retrieved address and the port being specified by the bit signal is established. The packet sent from device A passes through the switch 94 to the switch fabric 95 or further to the central processor 98 that then begins the transmission of the data to its destination device B.

The central processor 98 sends the data to step 104 where a function of performing address translation is done. The DA in the data is mapped into the port ID that the device B is connected to. Meanwhile a register at step 106 constantly looks up for any port ID appeared at step 104. Upon detecting an port ID at 104, the register at 106 retrieves the corresponding bit signal identifying the port connecting the device B 84 and meanwhile sends an enable signal to a buffer in the switch fabric 99 to start the transmission. It is understood to those skilled in the art that the central processor 98 can transfer the stored data to the buffer that becomes available in the switch fabric 99 or instructs the buffer to release the data stored therein. The corresponding MAC further processes the data to form a packet frame comprising the data. The switch circuit 102 establishes a respective link based on the port ID information received from step 106 and the buffer in the packet processing channel. The MAC in the switch fabric 99 sends an interrupt signal to the register in 106 as soon as the transmission of the data is finished. Upon receiving the interrupt signal, the switch circuit 102 disengages the links respectively and makes the ports available.

Figure 6:
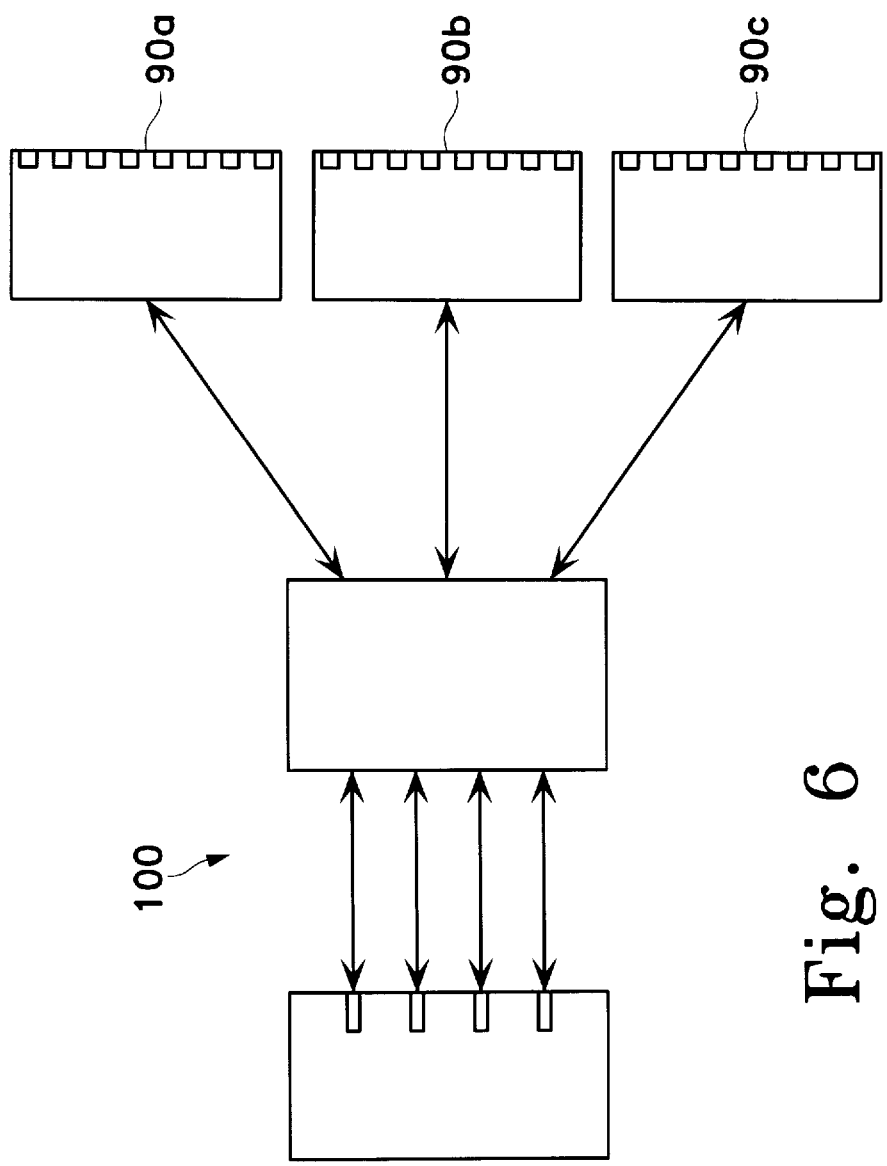
FIG. 6 demonstrates the modularity architecture of the disclosed switch system in an application in which the number of the local devices is increased.

In applications in which there is a need to add more devices, the conventional switch arrangement as described in the above would have to increase the capacity of the switch ports, resulting in a higher cost of the switch system. With the disclosed switch system, the number of the packet processing channels may remain the same. As stated herein, the Ethernet traffic is observed a burst mood. In this case, the N:M switch circuit needs to be reconfigured by increasing the number of ports on the M-side. Referring now to FIG. 6, there is shown a schematic diagram of the disclosed switch system 100 being reconfigured for more added devices. The switch circuit 44 of FIG. 3 or FIG. 4 is reconfigured to, for example, 4:24, namely four packet processing channels can effectively handle requests from the 24 devices. It is assumed that all connectivity modules have 8 ports, three connectivity modules 90a, 90b and 90c are connected to the disclosed switch system 100. In other words, there can be 24 devices directly in communication with each other while the cost of the switch system does not increase with the number of the added devices. For a desktop network, the rescalebility of the switch system provides a very cost-efficient solution.

The present invention has been described in sufficient detail with one exemplary embodiment. Alternative embodiments will become apparent to those skilled in the art to which the present invention pertains without departing from its spirit and scope. For example, the network interface may contain certain intelligent switch circuits that may automatically reroute all the packets and only filtrate packets that are no more than the number of the ports on the N-side of the switch circuit. This alternative embodiment essentially merges the N:M switch circuit into the network interface. Accordingly, the scope of the present invention is defined by the appended claims rather that the forgoing description of one embodiment.

What is claimed is:

1. A physical layer switch system for managing packets going through the physical layer switch system comprising:

a switch fabric having a plurality of packet processing channels, each comprising one buffer and one MAC;

a switch circuit having at least two first ports and a plurality of second ports, each of the first ports being connected to the packet processing channels, respectively, each of the first ports having a first address and each of the second ports having a second address, the switch circuit, upon receiving the equal number of the first and the second addresses, performing detachable links, respectively, between the first ports and the second ports, each being addressed by the received first and second addresses, respectively; and a network interface having a plurality of first ports and second ports, each of the first ports being connected to each of the second ports of the switch circuit, thereby each of the first ports has an identification in relation to one of the second addresses of the switch circuit.

2. The physical layer switch system as recited in claim 1 wherein the switch circuit disengages the detachable link upon the completion of one of the packets passing through the switch circuit.

3. The physical layer switch system as recited in claim 2 further comprising a state look-up circuit, the state look-up circuit providing the switch circuit with the first address and the second address for the switch circuit to establish the detachable link between the two ports specified by the first address and the second address, respectively.

4. The physical layer switch system as recited in claim 2 further comprising a database, the database keeping the first addresses of the first ports that are not being connected to any of the second ports in the switch circuit.

5. The physical layer switch system as recited in claim 4 wherein the network interface further comprises:

means for detecting a preamble in a packet being transmitted in the network;

means, upon receiving the packet, for generating a carrier sense signal, the carrier sense signal being asserted at the beginning of the packet and lasting through the packet, and a Rx request register for receiving the carrier sense signal as a first bit signal.

6. The physical layer switch system as recited in claim 5 wherein the state look-up circuit keeps monitoring the first bit signal in the Rx request register in the network interface, the state look-up circuit immediately retrieving one of the first addresses in the database upon detecting the first bit signal in the Rx request register.

7. The physical layer switch system as recited in claim 6 wherein the switch circuit, being connected at the second ports thereof to the network interface, establishes the detachable link between the first port and the second port specified by the first address and the second address received from the state look-up circuit.

8. The physical layer switch system as recited in claim 7 wherein the switch circuit disengages the detachable links upon the completion of the packet and the carrier sense signal received from the network interface.

9. The physical layer switch system as recited in claim 1 wherein the switch fabric further comprises an address map block that translates a destination address in the packet into an address signal that corresponds to one of the second ports of the network interface.

10. The physical layer switch system as recited in claim 9 wherein the network interface further comprises a Tx status register, the Tx status register recording the availability of the second ports of the network interface as second bit signals.

11. The physical layer switch system as recited in claim 10 further comprising a state look-up circuit, the state look-up circuit retrieving one of the second bit signals in the Tx register upon receiving the address signal from the address map block, the state look-up circuit further sending an enabling signal to the buffer in the packet processing channel specified by the address signal.

12. The physical layer switch system as recited in claim 11 wherein the switch circuit turns on a connection between one of the first ports specified by the address signal and one of the second ports specified by the second bit signal, thereby data in the buffer of the specifed packet processing channel passes through the switch circuit.

13. The physical layer switch system as recited in claim 12 wherein the switch circuit disengages the connection upon receiving an interrupt signal from the MAC in the specified packet processing signal, the interrupt signal generated in the MAC as soon as the packet passes through the switch fabric.

14. A physical layer switch system being coupled with a network interface having a plurality of first ports and second ports, means for detecting a preamble in a packet comprising a DA being transmitted in the network, means, upon receiving the packet, for generating a carrier sense signal and a status register for registering bit signals, the carrier sense signal being asserted at the beginning of the packet and lasting through the packet, the physical layer switch system comprising:

a switch fabric having a plurality of packet processing channels, each comprising one buffer and one MAC; and a switch circuit having a plurality of first ports and second ports, each of the first ports having a first address and being connected to the packet processing channels, respectively, each of the second ports having a second address and being connected to the first ports of the network interface, respectively, the switch circuit, upon receiving an equal number of the first addresses and the second addresses, performing detachable links between the ports specified by the first addresses and the second addresses, respectively.

15. The physical layer switch system as recited in claim 14 further comprising an address look-up table, the address look-up table coupled with the switch fabric, keeping the second addresses of the second ports that are not being connected to any of the first ports in the switch circuit.

16. The physical layer switch system as recited in claim 15 further comprising a state look-up circuit coupled with the address look-up table and having at least one connection to the switch circuit, the state look-up circuit retrieving one of the second addresses in the address look-up table upon detecting one of the bit signals in the status register of the network interface.

17. The physical layer switch system as recited in claim 16 wherein the state look-up circuit provides the switch circuit with the retrieved second addresses.

18. The physical layer switch system as recited in claim 14 wherein the switch circuit disengages the corresponding detachable link between the ports specified by the first address and the second address upon the completion of the packet going through the ports.

19. The physical layer switch system as recited in claim 14 further comprising an address look-up circuit, the address look-up circuit translating the DA information in the packet into a port ID corresponding to one of the second ports of the network interface.

20. The physical layer switch system as recited in claim 19 further comprising a status look-up circuit being communicated with the address look-up table, the status look-up circuit immediately looking up for the corresponding bit signal upon detecting the port ID in the look-up table.

21. The physical layer switch system as recited in claim 20 wherein the switch circuit establishes a link between two ports specified by the first address and the second address received from the status look-up circuit.

* * * * *